United States Patent [19]

Yuki

[11] Patent Number: 5,440,622
[45] Date of Patent: Aug. 8, 1995

[54] TELEPHONE FOR INHIBITING SPECIFIC CALLS DAILED BY AN AUDIBLE TONE GENERATOR

[75] Inventor: Takayuki Yuki, Kyoto, Japan

[73] Assignee: Rohm Co., Ltd., Japan

[21] Appl. No.: 187,343

[22] Filed: Jan. 26, 1994

[30] Foreign Application Priority Data

Jan. 26, 1993 [JP] Japan .................. 5-011036

[51] Int. Cl.⁶ ............................. H04M 3/38
[52] U.S. Cl. ................... 379/200; 379/356
[58] Field of Search ............ 379/200, 444, 355, 356, 379/357, 99, 188, 189

[56] References Cited

U.S. PATENT DOCUMENTS 4,297,534 10/1981 Epstein et al. .............. 379/200
4,947,422 8/1990 Smith et al. ................ 379/200

Primary Examiner—Ahmad Matar
Attorney, Agent, or Firm—Dickstein, Shapiro & Morin

[57] ABSTRACT

A telephone capable of controlling an expensive long distance call or international call from an audible tone generator through the telephone's handset. When the handset is lifted, an off-hook signal is output from a hook switch and a CPU outputs an internal hook signal to close a line switch. When a dialed number is input from the telephone's key board, the CPU checks the first digit of the dialed number. When the first digit is "0", the internal hook signal is output to release the line switch, otherwise a line loop is kept as it is to make a dialing possible. In turn, when a DTMF signal corresponding to the dialed number is input from a DTMF generator via the handset, a DTMF receiver interprets first digit of the dialed number and sends it to the CPU. When the first digit is "0", the CPU outputs an on-hook signal to release the line switch, otherwise the line loop is maintained to make the dialing possible.

6 Claims, 2 Drawing Sheets

TELEPHONE FOR INHIBITING SPECIFIC CALLS DAILED BY AN AUDIBLE TONE GENERATOR

BACKGROUND OF THE INVENTION i) Field of the Invention

The present invention relates to a telephone capable of inhibiting the sending of a particular selection signal to control an expensive long distance call.

ii) Description of the Related Arts

FIG. 4 illustrates a conventional telephone. In this telephone, a line switch 1 for connecting or disconnecting lines L1 and L2 is provided between a telephone exchange 2 and the telephone and executes a connecting or disconnection operation in response to an internal hook signal output from a CPU 8. One end of the line switch 1 is coupled with a DP (dial pulse) switching circuit 4 via a DB (diode bridge) circuit 3 and the DP switching circuit 4 is connected to a speech network circuit 5 to which a handset 6 is coupled.

A hook switch 7 which is operated in response to a mount or demount of the handset 6, and a key board 9 for inputting a dial number are linked to the CPU 8. The CPU 8 outputs the internal hook signal according to the input of the hook signal output from the hook switch 7 and carries out a coding of the key input from the key board 9 to output code data. Also, the CPU 8 is coupled with a first digit zero dial control circuit 10 and the first digit zero dial control circuit 10 is connected to a selection signal out circuit 11. The selection signal out circuit 11 outputs a DP signal to the DP switching circuit 4 or a tone signal such as a DTMF (dual tone multi-frequency obtained by combining two frequencies in an audio frequency band) signal to the speech network circuit 5.

Next, the operation of the above-described conventional telephone shown in FIG. 4 will now described.

First, when the handset 6 is lifted, the hook switch 7 is switched to a broken line position in response to the lift operation of the handset 6 and the a low level hook signal "L" is input to the CPU 8. Then, based on the low level hook signal, the CPU 8 outputs the internal hook signal so as to switch the line switch 1 to a broken line position. As a result, lines L1 and L2 form a loop.

In this state, when a dial number of a destination party or person is input from the key board 9, the CPU 8 codes the key input and outputs the code data to the first digit zero dial control circuit 10. When the first digit of this code data sent from the CPU 8 is not "0", this code data pass unchanged through the first digit zero dial control circuit 10 and is input to the selection signal out circuit 11. Hence, the selection signal out circuit 11 outputs the DP signal or the DTMF signal to the DP switching circuit 4 or the speech network circuit 5 on the basis of the code data. As a result, the telephone is linked to the destination party via the lines L1 and L2 and the telephone station exchange 2.

However, in case of a dialed number being of the destination party located outside a city (long distance), the first digit of this dial number input from the key board 9 is "0" (or "1" in the United States) and a code corresponding to this zero is input to the CPU 8. The CPU 8 discriminates that the first digit of the code is "0" and the code of this dialed number is not input to the selection signal out circuit 11. Thus the telephone is not linked with the destination party. Accordingly, the placing of an expensive long distance call or international call can be exactly inhibited.

Since the conventional telephone is constructed as described above, the placing of an expensive call such as the long distance call or the international call can be inhibited. However, when using a DTMF generator 12, such as a remote commander or the like, which is capable of recording the dialed number of the destination party as a DTMF signal and outputting the sound of this dialed number, the aforementioned transmission rule is invalidated. That is, when the DTMF signal of the remote commander is input to the speech network circuit 5 through a transmitter of the handset 6 and not through the CPU 8, the DTMF signal is sent out to the telephone exchange 2 via the DP switching circuit 4, the DB circuit 3, the line switch 1 and the lines L1 and L2 in the same manner as the case of the DTMF signal of the selection signal out circuit 11, and the telephone is linked to the destination party. Hence, the expensive call such as the international call to be inhibited can be carried out and the transmission rule is insufficient.

SUMMARY OF THE INVENTION

It is therefore an object of the present invention to provide a telephone in view of the aforementioned problems of the prior art, which is capable of exactly inhibiting a selection signal whose transmission is restricted and which is given to a telephone exchange via a transmitter of a handset.

A telephone according to the present invention comprises a transmitter for receiving as input a sound of a telephone call; a key board for inputting a dialed number; a tone signal output circuit for outputting a tone signal for a line selection depending on each digit of the dialed number input from the key board; a speech network circuit for carrying out a control for sending the tone signal input from the tone signal output circuit and a sound signal input from the transmitter onto a telephone line; a line switch for carrying out a formation and a cutoff of a loop of the telephone line; a decoding means for decoding the tone signal input to the speech network circuit from the speaker; and an instructing means for instructing the cutoff of the line switch depending on a decoded result of the decoding means.

In the telephone, only when each number of a predetermined digit from a first digit of the dialed number decoded by the decoded means is coincident with a predetermined number, can the decoding means instruct the cutoff of the line switch.

More specifically, only when the first digit of the dialed number decoded by the decoding means is "0", can the instructing means instruct the cutoff of the line switch.

Preferably, the telephone further comprises inhibiting means for checking the dialed number input from the key board and inhibiting the input of the dialed number to the tone signal output circuit when the number of the predetermined digit from the first digit of the dialed number is the predetermined number.

In the telephone, the tone signal for the line selection is a dual tone multi-frequency signal obtained by combining two frequencies in an audio frequency band.

The telephone can further comprise dial pulse signal generator means for generating a dial pulse signal depending on each digit of the dialed number input from the key board; and dial pulse output means for sending a dial pulse depending on the dial pulse signal generated by the dial pulse signal generator means onto the telephone line.

According to the present invention, in the telephone, the tone signal for the line selection input from the speaker is decoded and depending on this decoded result, the cutoff of the line switch is carried out.

BRIEF DESCRIPTION OF THE DRAWINGS

The objects, features and advantages of the present invention will become more apparent from the consideration of the following detailed description, taken in conjunction with the accompanying drawings, in which.

DESCRIPTION OF THE PREFERRED EMBODIMENTS

Figure 1:
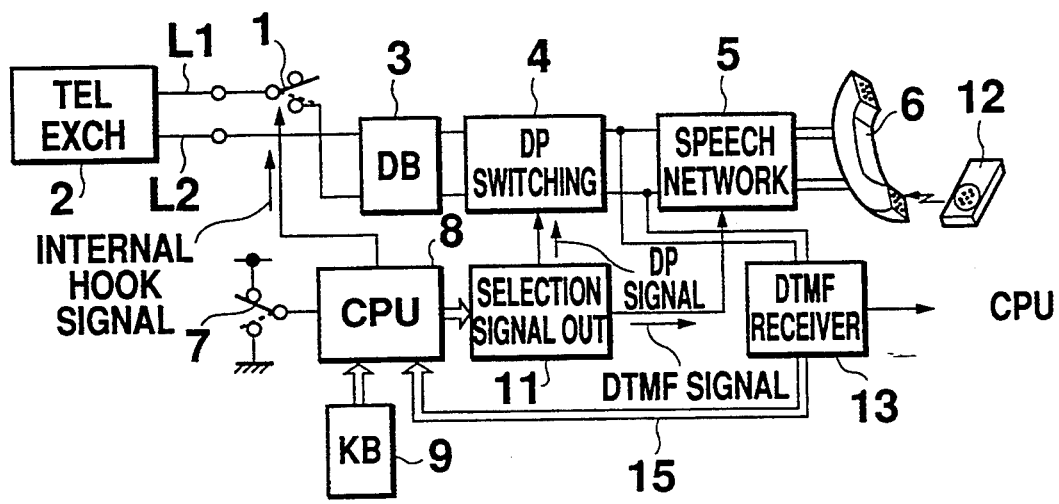
FIG. 1 is a block diagram of a telephone according to the present invention.

Referring now to the drawings, wherein like reference characters designate like or corresponding parts throughout the views or in the same manner as those of the conventional embodiment described above and thus the repeated description of the same parts can be omitted for brevity. There is shown in FIG. 1 one embodiment of a telephone according to the present invention.

As shown in FIG. 1, in this telephone, a line switch 1 for connecting or disconnecting lines L1 and L2 is provided between a telephone exchange 2 and the telephone and executes a connecting or disconnection operation in response to an internal hook signal output from a CPU 8. One end of the line switch 1 is coupled with a DP switching circuit 4, via a DB circuit 3, and the DP switching circuit 4 is connected to a speech network circuit 5 to which a handset 6 is coupled.

In this embodiment, a DTMF receiver 13 for decoding a tone signal such as a DTMF signal to be sent out to a telephone line is provided and is connected to the DP switching circuit 4 and the CPU 8 via a control line (not shown.

A hook switch 7, which is operated in response to a mount or demount of the handset 6, and a key board 9 for inputting a dialed number are linked to the CPU 8. The CPU outputs the internal hook signal according to the input of the hook signal output from the hook switch 7 and carries out a coding of the key input from the key board 9 to output code data to a selection signal out circuit 11. In response to this code data from the CPU 8, the selection signal out circuit 11 outputs a DP signal to the DP switching circuit 4 or a DTMF signal to the speech network circuit 5. In this case, in the selection signal out circuit 11, the selection of the DP signal or the DTMF signal is adapted to be executed by a predetermined setting.

Next, the operation of the above-described telephone shown in FIG. 1 will be described in connection with timing charts shown in FIG. 2 and FIG. 3.

Figure 2:
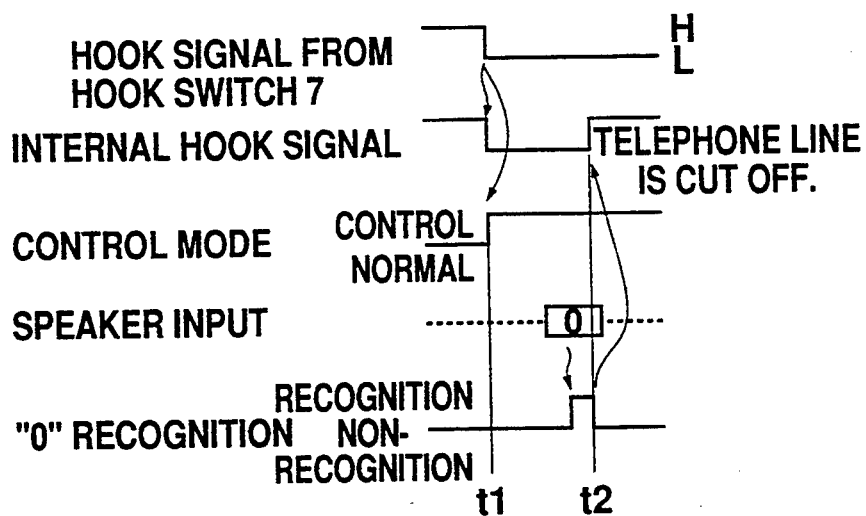
FIG. 2 is a timing chart explaining an operation of a case where a dialed number having a first digit of "0" is input from a remote commander in the telephone shown in FIG. 1.

FIG. 2 is a timing chart of a case where a first digit of "0" is input from a transmitter of the DTMF generator 12. As shown in FIG. 2, when the handset 6 is lifted at a time point t1, the hook signal of the hook switch 7 is changed from a high level "H" to a low level "L". Hence, the CPU 8 is placed in a control mode to receive the first digit and changes the internal hook signal to the L level, whereby the line switch 1 is closed to form the line loop by the lines L1 and L2.

In this state, when the DTMF signal "0" of the first digit is input from the DTMF generator 12 to the speech network circuit 5 via the transmitter, the DTMF receiver 13 decodes the DTMF signal input from the speech network circuit 5 to supply an interpret signal 15 for indicating the first digit to the CPU 8. When the CPU 8 recognizes the first digit of the decode signal 15 sent from the DTMF receiver 13 as "0", the CPU 8 changes the internal hook signal from the L level to the H level to release the line switch 1 and cuts off the line from the telephone at a time point t2. As a result, the DTMF signal input as the sound from the DTMF generator 12 can be inhibited from being sent out to the lines L1 and L2 via the speech network circuit 5.

Figure 3:
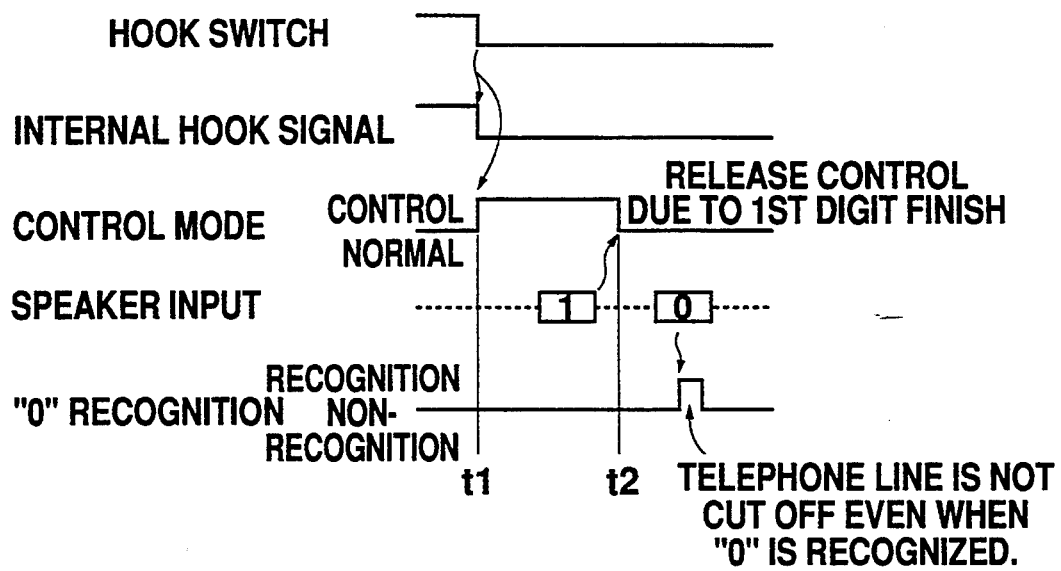
FIG. 3 is a timing chart explaining an operation of a case where a dialed number having a first digit of not "0" is input from the remote commander in the telephone shown in FIG. 1.
Figure 4:
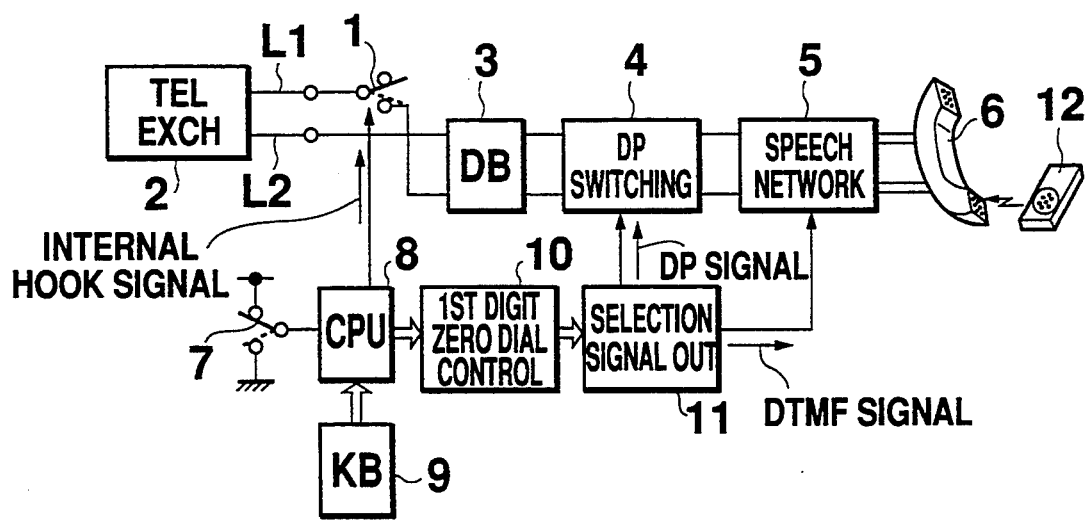
FIG. 4 is a block diagram of a conventional telephone.

FIG. 3 is a timing chart of another case where a first digit of "1" and a second digit of "0" are input from the transmitter of the DTMF generator 12. As shown in FIG. 3, when the handset 6 is lifted at the time point t1, the hook signal of the hook switch 7 is changed from the H level to the L level and the CPU 8 is placed in the control mode to receive the first digit and changes the internal hook signal to the L level. Hence, the line switch 1 is closed to form the line loop by the lines L1 and L2.

In this state, when the DTMF signal of "1" as the first digit is sent from the DTMF generator 12 to the speech network circuit 5 through the hand set 6, the DTMF receiver 13 decodes the input DTMF signal to convert it into the code and supplies the obtained code to the CPU 8. At this time, since the first digit of the decode signal 15 sent from the DTMF receiver 13 is "1", the CPU 8 does not execute the "0" recognition. As a result, at the time point t2 of the first digit input finish, the first zero dial control is released, and, even when the DTMF signal of "0" as the second digit is input to the DTMF receiver 13, the CPU 8 does not change the internal hook signal to the H level. Hence, the line switch 1 is kept closed and the telephone is not cut off from the lines L1 and L2. As a result, normal dialing can be conducted and the telephone call is possible.

On the other hand, when the dialed number is input from the key board 9, the CPU 8 codes the dialed number and, only when the first digit of the dialed number is not "0", the code data are supplied to the selection signal out circuit 11. The selection signal out circuit 11 outputs the DP signal or the DTMF signal to the DP switching circuit 4 or the speech network circuit 5 on the basis of the input code data. As a result, normal dialing can be carried out.

Further, when the first digit of the dialed number input from the key board 9 is "0", the CPU 8 does not execute the coding and returns the internal hook signal to the H level. Hence, the line switch 1 is cut off and the dialing can be inhibited. In this case, the DTMF receiver 13 is normally provided in a standard answer phone and thus there is no need to further supplement a DTMF receiver.

In this embodiment, although the dialing is controlled when the first digit of the dialed number which is input from the DTMF generator 12 and is decoded in the DTMF receiver 13 is "0", it can be possible to carry out the dial control when a digit which is a predetermined number of digits from the first digit is a predetermined number.

As described above, according to the present invention, the DTMF signal input from the transmitter by the remote commander or the like is decoded by the DTMF receiver and hence in the case where the first digit is "0" (or "1" in the United States) such as the expensive long distance or international call, the dialing can be inhibited. As a result, by using the DTMF receiver separated from a telephone body having a dial control function, the international or long distance call, which would be an expensive call can be exactly inhibited.

Although the present invention has been described in its preferred embodiment with reference to the accompanying drawings, it readily understood that the present invention is not restricted to the preferred embodiment and that various changes and modifications can be made by those skilled in the art without departing from the spirit and scope of the present invention.

What is claimed is:

1. A telephone comprising:
   a handset including means for receiving an audible tone signal representing a dialed number, the audible tone signal being generated external to the telephone;
   a keyboard for generating a dialed number;
   a selection signal out circuit for generating a tone signal in accordance with the dialed number generated by the keyboard;
   a speech network circuit for placing the audible tone signal received by the handset and the tone signal generated by the selection signal out circuit onto a telephone line loop;
   a line switch for opening and closing the telephone line loop;
   decoding means for decoding the audible tone signal received by the handset and placed on the telephone line loop by the speech network circuit to produce a decoded tone signal; and
   controlling means for controlling the line switch to selectively open the telephone line loop in accordance with the decoded tone signal.

2. The telephone of claim 1, wherein the controlling means controls the line switch to selectively open the telephone line loop only when a digit of a dialed number input by the keyboard or represented by the audible tone signal received by the handset which is a predetermined number of digits from a first digit of the dialed number is coincident with a predetermined number.

3. The telephone of claim 1, wherein the controlling means controls the line switch to selectively open the line loop only when the first digit of the dialed number input by the keyboard or represented by the audible tone signal received by the handset is "0".

4. The telephone of claim 1, further comprising means for checking the dialed number input from the keyboard and for inhibiting transmission of the dialed number from the keyboard to the selection signal out circuit when a digit of the dialed number, which is a predetermined number of digits from the first digit of the dialed number is a predetermined number.

5. The telephone of claim 1, wherein the audible tone signal received by the handset and the tone signal generated by the selection signal out circuit are DTMF (dual tone multi-frequency) signals obtained by combining two frequencies in an audio frequency band.

6. The telephone of claim 1, further comprising:
   dial pulse signal generator means for generating a dial pulse signal in accordance with each digit of the dialed number input from the keyboard; and
   dial pulse output means for placing a dial pulse in accordance with the dial pulse signal generated by the dial pulse signal generator means onto the telephone line loop.

* * * * *